US009210557B2

(12) United States Patent
Adatia et al.

(10) Patent No.: US 9,210,557 B2
(45) Date of Patent: Dec. 8, 2015

(54) SMS-INITIATED MOBILE REGISTRATION

(75) Inventors: Rahim Ismail Adatia, Santa Clara, CA (US); Iain Andrew Huxley, Sunnyvale, CA (US); Alexander Nickolas Linde, Belmont, CA (US); Torsten Schulz, Palo Alto, CA (US); Travis Scott Young, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 586 days.

(21) Appl. No.: 13/332,308

(22) Filed: Dec. 20, 2011

(65) Prior Publication Data

US 2012/0264427 A1 Oct. 18, 2012

Related U.S. Application Data

(60) Provisional application No. 61/474,743, filed on Apr. 12, 2011.

(51) Int. Cl.
*H04W 4/14* (2009.01)

(52) U.S. Cl.
CPC .................................... *H04W 4/14* (2013.01)

(58) Field of Classification Search
CPC ........................................ H04W 8/04
USPC ........................................ 455/435.1
See application file for complete search history.

(56) References Cited

U.S. PATENT DOCUMENTS 5,758,088 A 5/1998 Bezaire et al.
6,021,433 A 2/2000 Payne et al.
6,167,426 A 12/2000 Payne et al.
6,735,614 B1 5/2004 Payne et al.
7,308,261 B2 12/2007 Henderson et al.
2002/0084888 A1 7/2002 Jin (Continued)

FOREIGN PATENT DOCUMENTS

| | | |
|---|---|---|
| EP | 1819124 | 2/2006 |
| TW | 201044838 | 12/2010 |
| WO | WO 2008001231 | 1/2008 |

OTHER PUBLICATIONS

International Search Report and Written Opinion of Application No. PCT/US2012/033085 mailed Aug. 29, 2012.
Bajaj, V., "Spammers Pay Others to Answer Security Tests," New York Times, Apr. 26, 2010, 4 pages http://www.nytimes.com/2010/04/26/technology/26captcha.html?src=me&ref=technology accessed Oct. 28, 2011.

(Continued)

*Primary Examiner* — Huy C Ho
(74) *Attorney, Agent, or Firm* — James J. DeCarlo; Greenberg Traurig, LLP

(57) ABSTRACT

Embodiments are directed towards SMS-initiated mobile registration. A mobile device sends an SMS message to a mobile registration device. In response, the mobile registration device generates a random identifier and associates it with the mobile device identifier of the mobile device. Then, the mobile registration device sends a response SMS message to the mobile device, the response SMS message containing a Uniform Resource Identifier (URI) to a mobile registration web page, where the URI contains the generated random identifier. The mobile device uses the URI to navigate to the mobile registration web page, where additional registration information is provided. The mobile registration device associates the additional registration information with the mobile device based on the generated random identifier included in the URI, and creates a user account based on the mobile number from which the SMS message was received and the additional registration information.

20 Claims, 8 Drawing Sheets

100
103
Client Device
102
Client Device
104
Client Device
Wireless Network
110
101
Client Device
111
Wide Area Network/Local Area Network - (Network)
117
Mobile Registration Device

(56) References Cited

U.S. PATENT DOCUMENTS

| | | | | |
|---|---|---|---|---|
| 2004/0090930 | A1 | 5/2004 | Lee et al. | |
| 2005/0020270 | A1 | 1/2005 | Buckley | |
| 2005/0286489 | A1 | 12/2005 | Shin et al. | |
| 2006/0199598 | A1 | 9/2006 | Lee et al. | |
| 2007/0213039 | A1 | 9/2007 | Skog | |
| 2009/0228561 | A1 | 9/2009 | Finkeldey | |
| 2010/0287606 | A1 | 11/2010 | Machani | |
| 2011/0159848 | A1* | 6/2011 | Pei et al. | 455/411 |
| 2011/0250909 | A1* | 10/2011 | Mathias et al. | 455/466 |

OTHER PUBLICATIONS

Official Communication for U.S. Appl. No. 11/115,080 mailed Aug. 25, 2006.

Official Communication for U.S. Appl. No. 11/115,080 mailed Jan. 23, 2007.

Official Communication for U.S. Appl. No. 11/115,080 mailed Jul. 31, 2007.

Official Communication for U.S. Appl. No. 11/115,080 mailed Oct. 17, 2007.

* cited by examiner

601

Step 1. User Sends SMS initiating process and receives response with URL

602

Step 2. User launches link to begin registration and enters name and gender

Basic Info (1/3)
Welcome to Yahoo! user sign-up
First Name
Anabel
Last Name
Finn
Gender
Male
Female
Continue

603

3. User selects desired user ID from suggestions

4. User enters password and birthday

604

5. Account is created

605

Registration on New MSISDN

801 Token Reserved

| token | abcdefgh |
|---|---|
| msisdn | +14085551212 |

802 MSISDN Entry created with token association

| msisdn | +14085551212 |
|---|---|
| token | abcdefgh |
| tokenExpiration | TS(+3hrs) |
| tokenExpirationExtensions | 0 |
| recentRegistrations | |

| token | abcdefgh |
|---|---|
| msisdn | +14085551212 |

803 Token association removed, recent registration timestamp added

| msisdn | +14085551212 |
|---|---|
| token | |
| tokenExpiration | |
| tokenExpirationExtensions | |
| recentRegistrations | TS(-0.1hrs) |

| token | abcdefgh |
|---|---|
| msisdn | +14085551212 |

804 Token cleaned up

| msisdn | +14085551212 |
|---|---|
| token | |
| tokenExpiration | |
| tokenExpirationExtensions | |
| recentRegistrations | TS(-0.1hrs) |

Registration on MSISDN which has recent registration, including example of one expiration extension

851 Token Reserved

| msisdn | +14085551212 |
|---|---|
| token | |
| tokenExpiration | |
| tokenExpirationExtensions | |
| recentRegistrations | TS(-8hrs) |

| token | ijklmnop |
|---|---|
| msisdn | +14085551212 |

852 MSISDN entry updated with new token association

| msisdn | +14085551212 |
|---|---|
| token | ijklmnop |
| tokenExpiration | TS(+3hrs) |
| tokenExpirationExtensions | 0 |
| recentRegistrations | TS(-8hrs) |

| token | ijklmnop |
|---|---|
| msisdn | +14085551212 |

853 Token expiration extended (another incoming SMS from MSISDN)

| msisdn | +14085551212 |
|---|---|
| token | ijklmnop |
| tokenExpiration | TS(+3hrs) |
| tokenExpirationExtensions | 1 |
| recentRegistrations | TS(-8.1hrs) |

| token | ijklmnop |
|---|---|
| msisdn | +14085551212 |

854 Token association removed, recent registration timestamp added

| msisdn | +14085551212 |
|---|---|
| token | |
| tokenExpiration | |
| tokenExpirationExtensions | |
| recentRegistrations | TS(-8.2hrs), TS(-0.1hrs) |

| token | ijklmnop |
|---|---|
| msisdn | +14085551212 |

855 Token cleaned up

| msisdn | +14085551212 |
|---|---|
| token | ijklmnop |
| tokenExpiration | TS(+3hrs) |
| tokenExpirationExtensions | 1 |
| recentRegistrations | TS(-8.2hrs), TS(-0.1hrs) |

*FIG. 8*

SMS-INITIATED MOBILE REGISTRATION

CROSS-REFERENCE TO RELATED APPLICATION

This utility patent application claims benefit to U.S. Provisional Patent Application Ser. No. 61/474,743 filed on Apr. 12, 2011, and entitled. "SMS-Initiated Mobile Registration" the benefit of which is claimed under 35 U.S.C. §119, and which is incorporated herein by reference.

TECHNICAL FIELD

The present embodiments relate generally to mobile registration and, more particularly, but not exclusively, to a mobile registration initiated with Short Message Service (SMS) message.

BACKGROUND

In a world where mobile devices account for an increasing percentage of Internet traffic, it may be helpful to introduce a method to register for an online account through mobile devices. Online registration allows users access to a range of services from one or more service providers. For example, email, calendar, instant messaging, online chat groups, and the like, may require a user to register for an account and login before using the service. This may be particularly helpful in emerging markets, where it is common for a user to have a mobile device as their primary, or even only, Internet access medium.

However, many challenges persist that have prevented a satisfactory solution to the problem of mobile registration. For example, spammers continue to register large numbers of online accounts, such as email accounts, for the purpose of sending massive amounts of unsolicited email. Also, thousands of types of mobile devices are in use throughout the world, complicating efforts to create a mobile registration process that reaches these many types of devices while still minimizing registration abuse. Moreover, registration processes tend to be overly complex, thereby confusing potential users and reducing conversion rates. Thus, it is with respect to these considerations and others that the present embodiments are made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which:

FIG. 8 illustrates a diagram showing one embodiment of registration data stored during a process for registering a Mobile Subscriber Integrated Services Digital Network (MSISDN) number.

DETAILED DESCRIPTION

Figure 1:
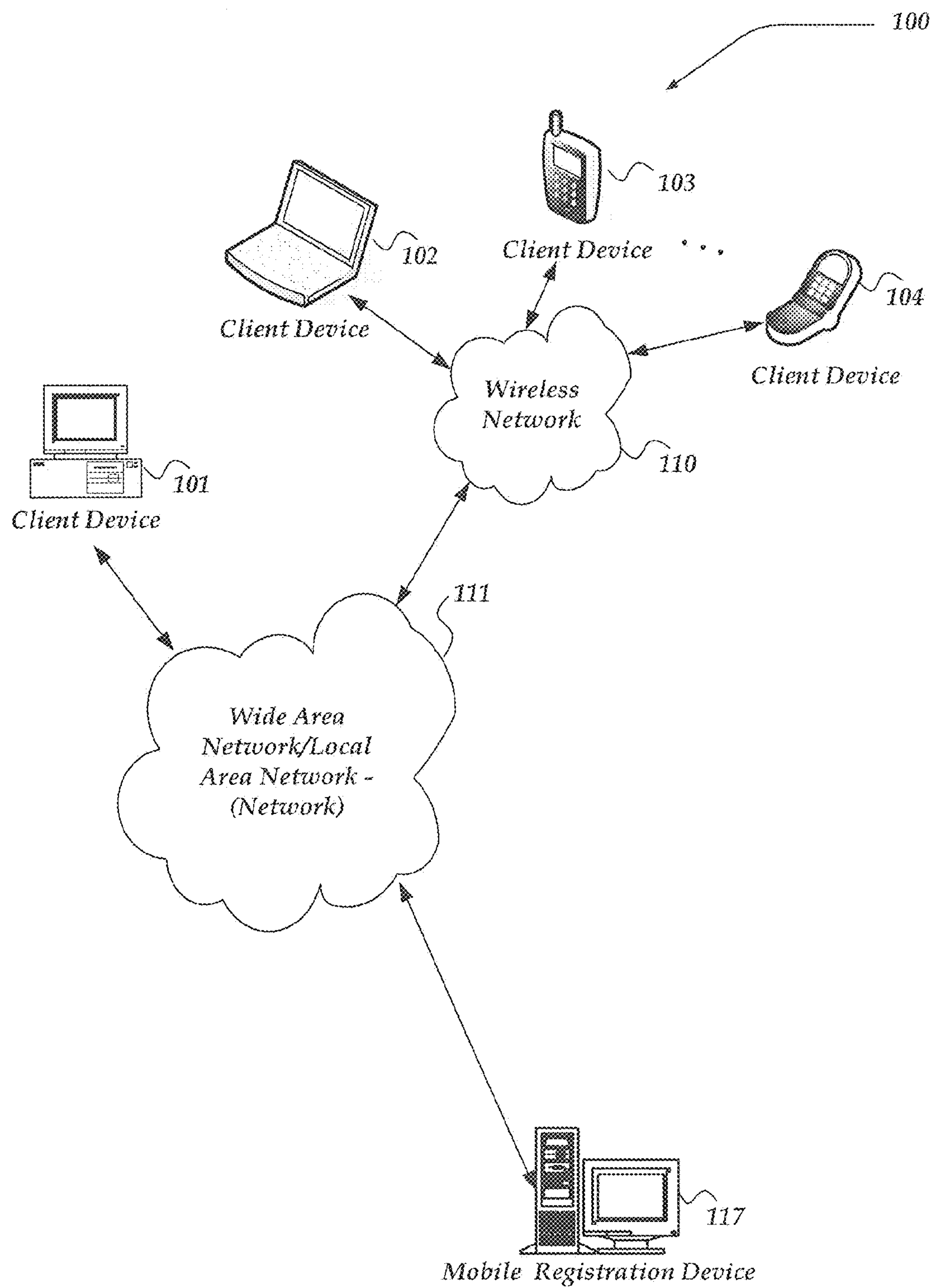
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware, entirely software, or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "SMS message" refers to a Short Message Service message, a Multimedia. Messaging Service (MMS) message, Enhanced Messaging Service (EMS) message, or any other type of message transmitted from a mobile device that contains the mobile number of the mobile device.

As used herein, the terms "mobile device" and "mobile phone" refer to any device that is assigned a phone number and that is capable of sending and receiving SMS messages. Throughout this disclosure the terms mobile phone and mobile device are used interchangeably.

As used herein, the term "phone number" refers to a Mobile Identification Number (MIN), an electronic serial number (ESN), MSISDN number, or any other mobile device identifier. Throughout this disclosure the terms phone number and mobile device identifier are used interchangeably.

As used herein, the term "registration" refers to the act (or acts) of collecting information about a user and creating an account based on the collected information. This information may include, for example, the user's name, a unique ID, the user's gender; date of birth (for corporate legal and demographic purposes), and/or a password. A registration flow may collect user account information in a manner that can accommodate a wide range of mobile phone capabilities.

A number of hurdles exist to enabling user registration. First, while hundreds of millions of people use personal computers (PCs) with keyboards, a mouse, a full sized screen, and a web browser, more and more internet traffic, including user registration, occurs over mobile phones. Thus, a mechanism for enabling registration tailored to mobile phone users is desirable. However, the mobile handset market is extremely fragmented and is expected to continue to be so for some time. While Apple, Android, and RIM phones are taking a larger proportion of the Smartphone segment, non-Smartphones (feature phones) are expected to still make up a large percentage of the mobile phone market. Thus, any solution to the problem of mobile registration should preferably reach as many mobile phone users as possible, including users of feature phones.

Low-end devices such as feature phones introduce a number of feature restrictions to overcome when enabling user registration, such as a numeric keypad, small, low-resolution screens (for example, 128 pixels by 128 pixels), and limited bandwidth capabilities. However, the percentage of feature phones is high in emerging markets, and so it is advantageous to provide a mechanism for mobile registration that works within the limitations of these devices.

All mobile registration flows involve some drop-off, as users decide whether to continue through based on the level of convenience experienced. However, convenience is difficult to achieve on a mobile device, as web pages are harder to view and data is much more difficult to enter on a mobile device compared to a PC.

In addition to creating a user account, user registration typically also provides a means of account recovery (AR) and/or abuse/fraud prevention. Account recovery is a method for a user to recover their account in the event that they forget their password. Abuse/fraud prevention includes, or example, preventing spammers from creating accounts with which to send spurn, phishing attacks, or other malware. Existing techniques for enabling account recovery and for abuse/fraud prevention have their own limitations.

Traditionally, three mechanisms have been employed to facilitate Account Recovery: Two Password Question Answers (2PWQA), alternate email, and associated phone number.

2PWQA: 2PWQA requests that the user answer two secret questions that can be presented back to the user for account recovery. Having a new user submit 2PWQA is cumbersome on a mobile phone. Even when the user is capable of answering these questions, there is no guarantee that they are answering correctly or that they will recall the answers when prompted. For example: A user frequently can not recall if they answered the question "Which street did you grow up on" with "Main St" or "Main Street".

Alternate Email: Asking a user for an alternate email address is not ideal on a mobile phone either since it is difficult to validate. The user would either need to switch to another application or to another webpage in order to validate their e-mail address. Furthermore, if the user is a new-to-net user, they may not have an alternate email to provide.

Associated Phone Number: This is an attribute that can be validated reliably on a mobile phone. However, having the user explicitly type their phone number into a mobile web page is prone to human error and open to abuse by typing in another person's phone number. The embodiments described herein are directed in part towards addressing these deficiencies in existing account recover techniques.

Abuse is an unfortunate reality with free services. There is real value motivating abusive users to create accounts, as for example they may make money sending spam or phishing attempts via email or IM. Although an account sending spam is typically blocked after its behavior is recognized, it is desirable not to provide a simple way to automatically create fresh accounts for abusers. Existing Methods used for abuse prevention include Completely Automated Public Turing test to tell Computers and Humans Apart (CAPTCHA) and server-initiated SMS.

CAPTCHA: A common method used to combat the creation of abusive accounts requires the user to enter a "CAPTCHA" image (a series of distorted letters that they must try to enter correctly), which can be particularly frustrating on a mobile device and which introduces a significant barrier to successful registration completion. On the desktop, users generally tail at typing in a CAPTCHA correctly a percentage of the time. Moreover, as the premise behind CAPTCHAs is to raise the difficulty for fraudulent users in creating a new account, eventually there is an inflection point where it becomes difficult for real users to create accounts as well.

Furthermore, while adding an additional hurdle, CAPTCHA may still not be effective, as solving CAPTCHAs has been commoditized by use of human farms to solve them.

Server initiated SMS: Many services attempt to use server initiated SMS messages to validate a real user, which entails having the user manually type in their phone number within a mobile web flow. While this assists with preventing fraudulent accounts from being created, it is not a desirable user experience as it requires manual entry, and it is still open to abuse, such as a user purposely typing in another person's phone number.

Many of these deficiencies in existing registration systems may be significant in emerging markets, where it is expected that a number of users will be new-to-net users—users where their first experience of using Internet services will be via their mobile phone. New-to-net users may have no existing email address, making asking for an Alternate E-Mail address inapplicable. Moreover, the mobile phone is the primary means of access, making simple and effective registration flow even more important.

The following briefly describes the embodiments in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments relate to a process for SMS-initiated mobile registration. In one embodiment a mobile device sends an SMS message to a mobile registration device. In one embodiment, the mobile registration device generates a random identifier and associates it with the mobile device identifier of the mobile device. Then, the mobile registration device sends a response SMS message to the mobile device, the response SMS message containing a Uniform Resource Identifier (URI) to a mobile registration web page, where the URI contains the generated random identifier. Then, the mobile device uses the URI to navigate to the mobile registration web page, where additional registration information such as username, age, password, and the like are provided. In one embodiment, the mobile registration device associates the additional registration information with the mobile device based on the generated random identifier included in the URI, and then creates a user account based on the mobile number from which the SMS message was received and the additional registration information.

An SMS-initiated flow solves both account recovery concerns in addition to reducing the potential for abuse. By receiving art SMS, the mobile registration device is able to extract the user's phone number and propagate it to a Mobile Registration service to associate with a newly created account. Thus, unlike a secondary email address, the user's phone number does not need to be explicitly entered by the user, nor is the user's phone number subject to abuse by entering another person's phone number. The user's phone number may thus be used for account recovery if the user has forgotten their password. For example, the user's identity may be confirmed by sending an SMS message containing a verification code (such as a string of random characters) to the user's mobile phone. Subsequently, the user may provide the verification code to a website associated with the mobile registration device, thus confirming their identity.

The user initiated SMS mechanism also provides abuse protection. In one embodiment, a given phone number may be allowed to register a limited threshold number of times, or at a limited threshold rate, SMS-initiated mobile Registration thus limits the number of accounts that can be created with a particular phone number over a set time period. Since the user sends the text message to initiate the flow, a user need not enter their phone number. Associated costs of the service may be reduced with carriers that charge based upon "ratios" of Messages sent (MT) and Messages received (MO).

The SMS initiated flow may be easily communicated via non-mobile advertising (including billboards etc) with a simple "call-to-action" to the user such as "Text START to 92500 to sign up for an online account".

Illustrative Operating Environment

FIG. 1 shows components of an environment in which embodiments may be practiced. Not all the components may be required to practice the embodiments, and variations in the arrangement and type of the components may be made without departing from the spirit or scope of the embodiments. As shown, system 100 of FIG. 1 includes wide area networks ("WANs")/local area networks ("LANs")-(network) 111, wireless network 110, client devices 101-104, and mobile registration device 117.

One embodiment of client devices 101-104 is described in more detail below in conjunction with FIG. 2. Generally, however, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome Liquid Crystal Display (LCD) display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing various online activities, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display a web page, including one or more account registration web pages.

In one embodiment, a user of the client device may initiate a mobile registration by sending an SMS message to mobile registration device 117. The client device may provide information that identifies itself, including a type, capability, name, and the like. In one embodiment, client devices 102-104 may uniquely identify themselves through any of a variety of mechanisms, including a phone number, Mobile identification Number (MIN), an electronic serial number (ESN), MSISDN number, or any other mobile device identifier. Such information may be provided in a network packet, or the like, when an SMS message is sent to mobile registration device 117.

Client devices 101-104 may further be configured to navigate to a mobile registration web page using the browser application. The browser application may be used to submit user information, such as name, age, password, and the like, while registering a user account.

Wireless network 110 is configured to couple client devices 102-104 and its components with network 111. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including $2^{nd}$ (2G), $3^{rd}$ (3G), $4^{th}$ (4G), $5^{th}$ (5G) generation radio access for cellular systems, WLAN, Wireless Router (WR) mesh, and the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 111 is configured to couple network devices with other computing devices, including, mobile registration devices 117 and client device 101, and through wireless network 110 to client devices 102-104. Network ill is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based cm differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of mobile registration device 117 is described in more detail below in conjunction with FIG. 3. Briefly, however, mobile registration device 117 represents one or more network devices configured to receive and process mobile registration requests.

Devices that may operate as mobile registration device 117 include various network devices, including, but not limited to personal computers, desktop computers, multiprocessor systems, microprocessor-based or programmable consumer electronics, network PCs, server devices, network appliances, and the like. It should be noted that while various devices such as mobile registration device 117 are shown as a single device, registration device 117 may be embodied by a plurality of such devices. For example registration device 117 may also be implemented across different devices. Moreover, mobile registration device 117 may be implemented on a cloud infrastructure.

Illustrative Client Device

Figure 2:
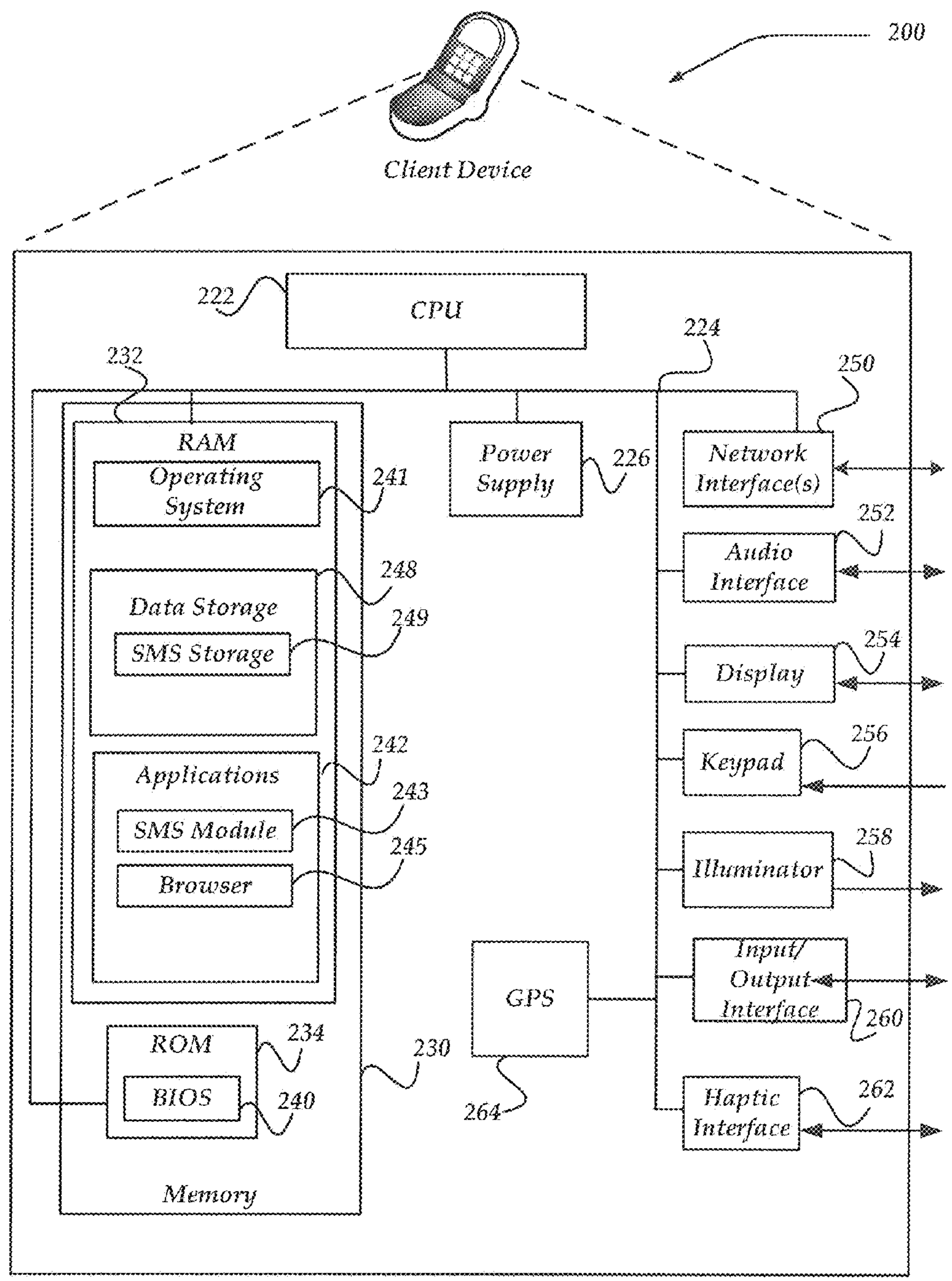
FIG. 2 shows one embodiment of a client device that may be included in the system of FIG. 1.

FIG. 2 shows one embodiment of client device 200 that may be included in a system implementing an embodiment. Client device 200 may include many more or less components than those shown in FIG. 2. However, the components shown are sufficient to disclose an illustrative embodiment. Client device 200 may represent, for example, one embodiment of at least one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user or example, keypad 256 may include a push button numeric dial, or a keyboard. Keypad 256 may also include command buttons that are associated with selecting and sending images illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2, input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control (MAC) address, IP address, or the like.

Mass memory 230 includes a RAM 232, a ROM 234, and other storage means. Mass memory 230 illustrates an example of computer readable storage media (devices) for storage of information such as computer readable instructions, non-transitory computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, SMS messages in SMS storage 249.

Applications 242 may include computer executable instructions which such as SMS module 243, which when executed by client device 200, may transmit, receive, and/or otherwise process messages (e.g., SMS, MMS, IM, email, and/or other messages), audio, video, and enable telecommunication with another user of another client device. Other examples of application programs include calendars, search programs, email clients, IM applications, VOIP applications, contact managers, task managers, transcoders, database programs, word processing programs, security applications, spreadsheet programs, games, search programs, and so forth. Applications 242 may also include, for example, browser 245 for navigating to and interacting with web pages.

Browser 245 may include virtually any application configured to receive and display graphics, text, multimedia, and the like, employing virtually any web based language, in one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may be employed. In one embodiment, browser 245 may enable a user of client device 200 to provide and/or receive content between another computing device for posting, reading, and/or otherwise communicating with another client device. Similarly, browser 245 may enable a user of client device 200 to access one or more search engines to perform various search queries for content, including image content, and/or other multimedia content.

Illustrative Network Device

Figure 3:
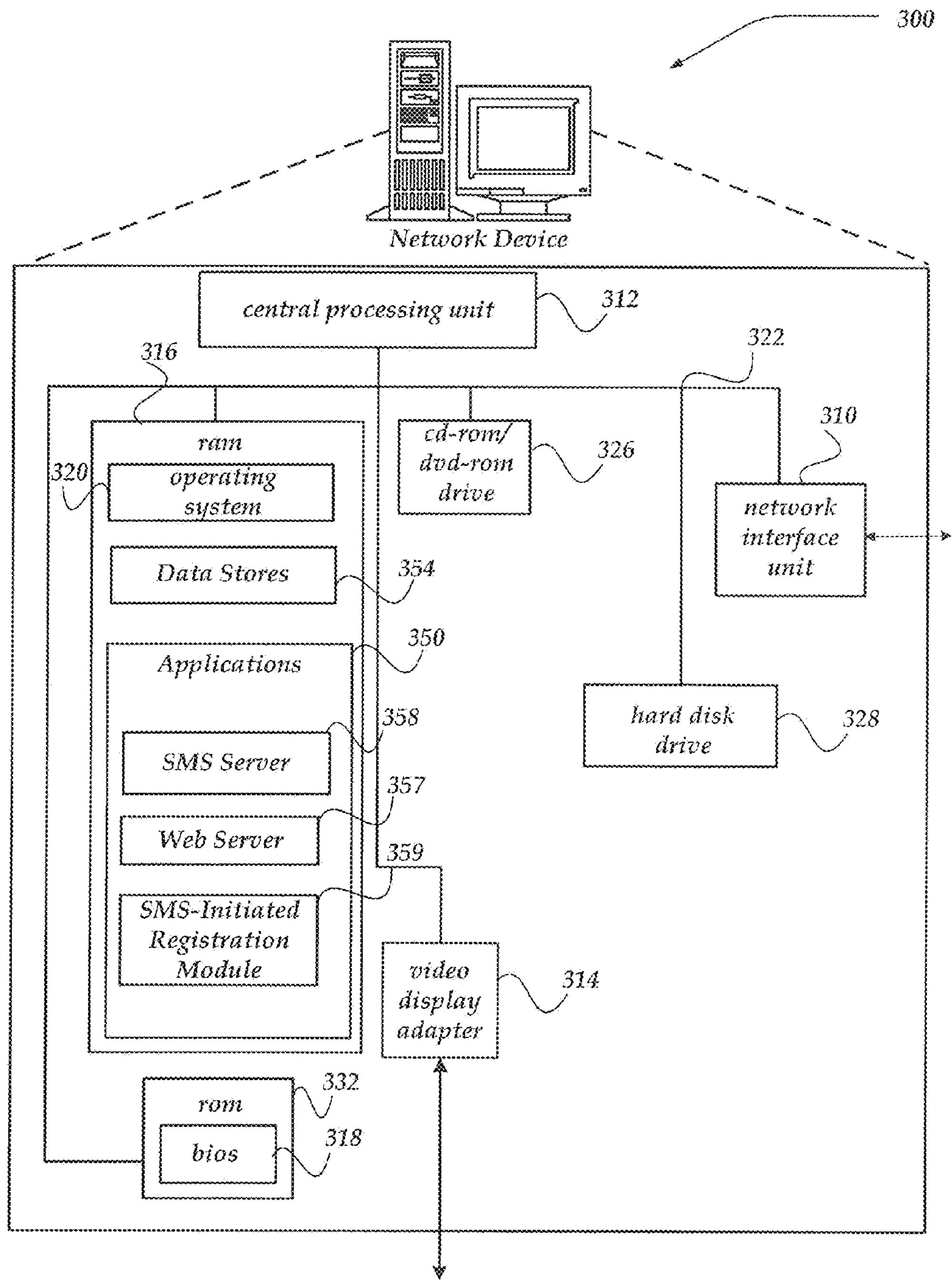
FIG. 3 shows one embodiment of a network device that may be included in the system of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, mobile registration device 117.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, compact-disc read only memory (CD-ROM)/digital versatile disc-ROM (DVD-ROM) drive 326, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable/processor-readable media, namely computer-readable storage media. Computer-readable storage media (devices) may include volatile, nonvolatile, non-transitory, removable, and non-removable media implemented in any method or technology for storage of information, such as computer readable instructions, data structures, program modules, or other data. Examples of computer-readable storage media include RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store user account identifiers, mobile device numbers, randomly generated identifiers associated with mobile device numbers, user profiles, email addresses, IM addresses, SMS messages, and/or other network addresses; or the like. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, IM message servers, email servers, account managers, and so forth. SMS server 358, web server 357, and SMS-initiated registration module 359 may also be included as application programs within applications 350.

SMS server 358 may include virtually any computing component or components configured and arranged to send and/or receive SMS message user agents, and/or other message servers, or to deliver messages to a local message store, such as data store 354, or the like. In one embodiment, messaging server 358 may enable users to initiate mobile registration.

SMS-initiated registration module 359 may receive and process an SMS message initiating user registration, as discussed in more detail below with regard to FIGS. 4-8.

Web server 357 may provide one or more mobile registration web pages in response to a request from a client device. In one embodiment, the mobile registration web page(s) may receive registration information from a user and submit this information to web server 357 using a URI that contains information associating the submitted registration information with the user who initiated account registration.

Generalized Operation

The operation of certain aspects of the invention will now be described with respect to FIGS. 4-5. The operations of the processes described below for FIG. 4 may, in one embodiment, be performed in one or more mobile devices, such as client devices 102-104 of FIG. 1.

Figure 4:
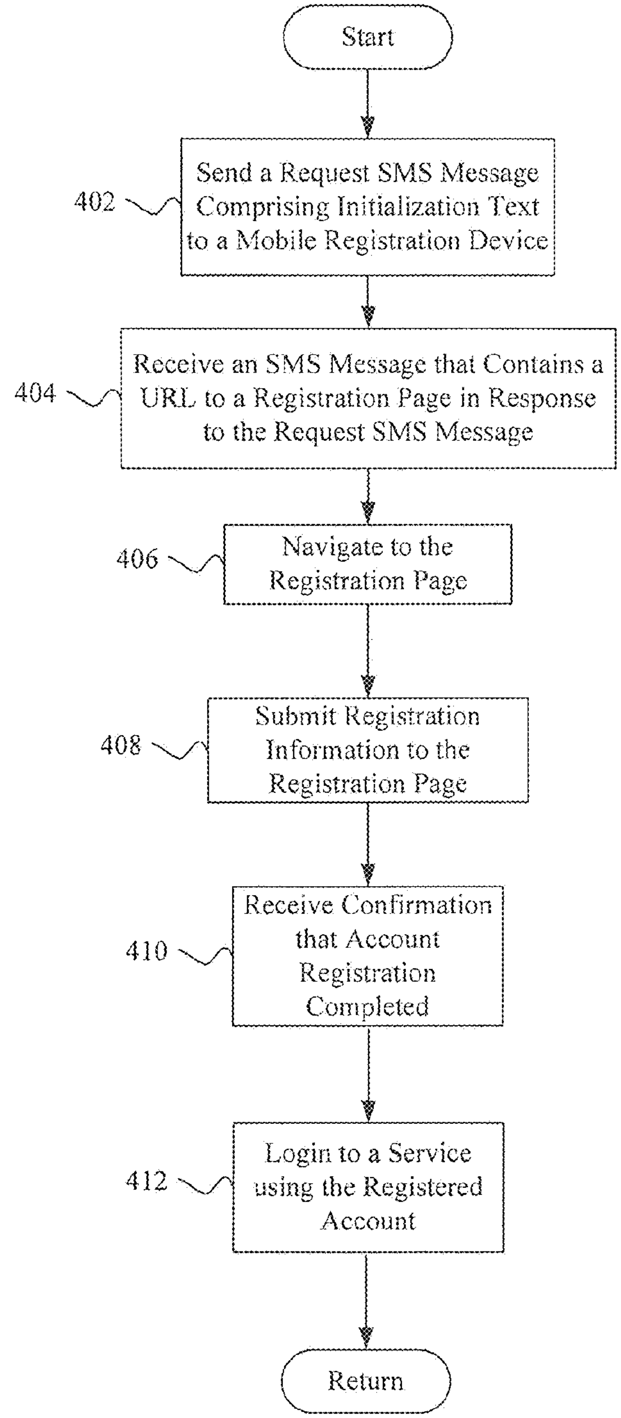
FIG. 4 illustrates a logical flow generally showing one embodiment of a process employed by a mobile device for performing SMS-initiated mobile registration.

FIG. 4 illustrates a logical flow 400, generally showing one embodiment of a process employed by a mobile device for performing SMS-initiated mobile registration.

Process 400 begins, after a start block, at block 402, where a request SMS message comprising initialization text is sent to a mobile registration device. In one embodiment, the request SMS message is sent from a client device, such as one of client devices 101-104 of FIG. 1. The SMS message may be addressed to a particular phone number, a short code, or the like, associated with the mobile registration device. In one embodiment, the request SMS message includes initialization text, such as a string of alpha-numeric characters, a keyword, a passcode, or the like, indicating that the user of the mobile device would like to begin registration. For example, in one embodiment, the user initiates the registration flow by sending the message 'START' to the number 92500. Use of an SMS-initiated flow is directed towards Abuse Prevention and Validation of Phone Number for Account Recovery.

Process 400 proceeds to block 404, where an SMS message containing a URL to a registration page is received in response to the request SMS message. In one embodiment the URL to the registration page includes a token, such as a randomly generated string of characters, used to associate the mobile registration device with registration information that may later be submitted using a registration web page.

Process 400 then proceeds to block 406, where the mobile device may navigate to the registration page pointed to by the URL contained in the response SMS message. In one embodiment the registration page is downloaded to the mobile phone and presented to the user of the mobile phone to collect registration information.

Process 400 then proceeds to block 408, where registration information entered by a user into the registration web page is submitted to the mobile registration device. In one embodiment the registration information is submitted directly to the mobile registration device, although alternatively the registration information may be submitted to a web server to complete the registration process.

In another embodiment, registration information may be submitted within the request SMS message. For example, in addition to the initialization message (such as "START"), the request SMS message may include a user's full name, a requested username, birth date, or the like.

In one embodiment, since the user's phone number is collected via a user-initiated SMS message, the mobile registration device already has sufficient information to perform an account recovery operation. Thus, in one embodiment, other types of information that might be used to perform an account recovery operation may be omitted from the registration web page.

In one embodiment, to further ease the burden on the user of a mobile device when registering an account, a simple ID selection process presents suggestions of possible user IDs based on a provided name. However, a user may also be allowed to search for a custom ID. In addition, by using the country code extracted from the user initiated SMS and headers provided when the user follows the provided URL, the mobile platform can determine the user's geographical region, including country, state, county, city, zip-code, etc., for account creation.

Process 400 then proceeds to block 410, where a confirmation that account registration has completed is received by the mobile device.

Process 400 then proceeds to block 412, where the user of the mobile device may log into to a service, such as an email account, for example, using the newly registered account. After block 412, process 400 returns to a calling process to perform other actions.

Figure 5:
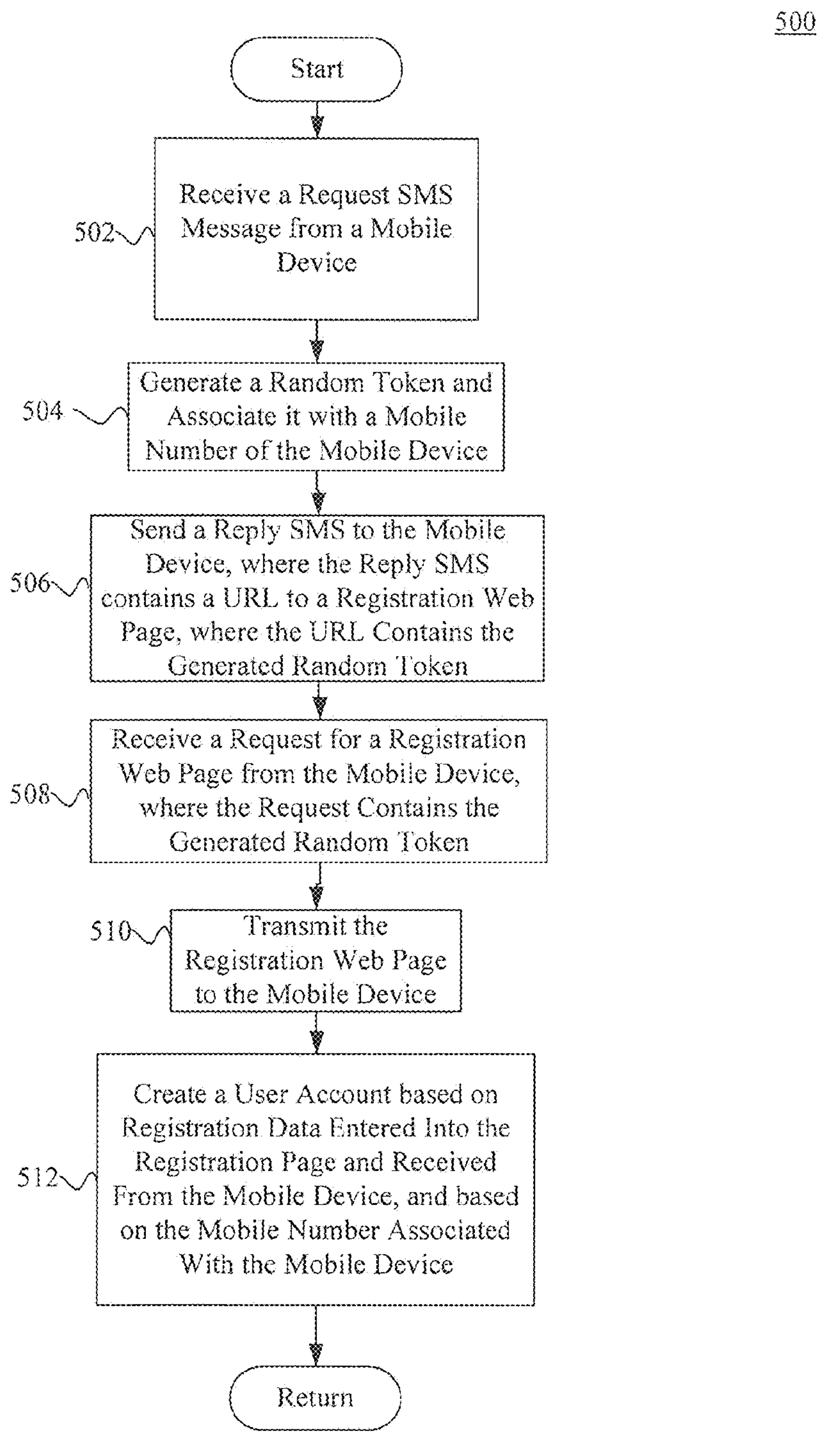
FIG. 5 illustrates a logical flow generally showing one embodiment of a process employed by a mobile registration device for performing SMS-initiated mobile registration.

FIG. 5 illustrates a logical flow generally showing one embodiment of a process employed by a mobile registration device for performing SMS-initiated mobile registration. The operations of the processes described below for FIG. 5 may, in one embodiment, be performed within a mobile registration device, such as mobile registration device 117 of FIG. 1.

Process 500 begins, after a start block, at block 502, where a request SMS message is received from a mobile device. One embodiment of the request SMS message is described above in conjunction with block 402 of FIG. 4.

Process 500 proceeds to block 504, where a random token is generated and associated with the mobile number of the mobile device that sent the request SMS message. In one embodiment, a random token is generated and managed in a way that prevents user registration abuse as discussed herein. In one embodiment, the MSISDN/token management system randomly or pseudo-randomly generates token which can be sent in a URI and used to resolve back to the MSISDN that initiated the transaction.

In one embodiment the token is generated with consideration for users that may type the token manually into their device, such as refraining from using characters which can be confused. For example, the number '1' and the letter '1' (lower-case 'L') may be omitted from the set of possible characters used go generate the token.

In one embodiment, registration abuse is prevented by ensuring that tokens expire after TOKEN_EXPIRATION_MINUTES, which may later be extended a limited number of times upon receiving a new request SMS from the user, and by providing an approximate chance of 1 in a billion (possibly 10 in a billion, 100 in a billion, 1 in a trillion, or any other ratio) of getting a valid token if choosing one at random. In this way, it is difficult if not impossible for someone to randomly guess and then utilize a token assigned to another user.

In one embodiment, the generated token is mapped to an MSISDN using two tables main table keyed off the MSISDN, and a table for mapping the token to the MSISDN. In one embodiment, the MSISDN-keyed table is considered the source of truth from which decisions are made regarding allowing registration to proceed.

Pseudo code of one non-limiting example algorithm used to generate a token is listed here:

```
// get a token for an MSISDN
getToken(msisdn)
  - if no existing msisdn record
    - reserve new token (retry if collision)
    - create msisdn record with reference to token
    - *return token*
  - else (existing msisdn record)
    - if max registrations reached for this MSISDN
      - *return error*
    - if existing valid token with expiration extensions available
      - update token record to bump the record's expiration
      - update msisdn record to bump the token expiration field,
num expirations, and bump record's expiration.
      - *return token*
    - reserve new token (retry if collision)
    - update msisdn record with reference to token, extending the
    record's expiration
    - *return token*
```

Process 500 proceeds to block 506, where a reply SMS is sent to the mobile device, where the reply SMS contains a URL to a registration web page, and where the URL to the registration web page contains the generated random token. For example, if the generated random token was 'abcdefgh', an example URL to a registration web page may be 'http://www.somedomain.com/register?randomID=abcdefgh'.

Process 500 proceeds to block 508, where a request for the registration web page is received from the mobile device. In one embodiment, the request for the registration web page is the result of a user navigating to the URL included in the reply SMS message. In one embodiment the token is resolved against a database of known tokens, validating the request to register. One embodiment of an algorithm for resolving the token contained in the URL is listed here:

```
// resolve a token
resolveToken(token)
  - if no token record or no corresponding msisdn record
    - *return error*
  - if token in msisdn record does not match or is expired
    - *return error*
  - *return msisdn*
```

Process 500 proceeds to block 510, where the requested registration web page is transmitted to the mobile device. In one embodiment the registration web page contains one or more forms, or other means of collecting input from the user of the mobile device, into which the user of the mobile device may enter registration information, such as name, username, birth day, or the like.

Process 500 then proceeds to block 512, where a user account is created based on information extracted from the request SMS, including the phone number of the mobile user, as well as registration information submitted by the user through the registration web page. In one embodiment, the account is created if the token included in the URL to the registration web page is associated with a valid, unexpired token. One example algorithm used to check if registration information is valid, and thus whether an account can be created, is listed here:

```
// called to notify that an account is about to be created
(and get the go-ahead)
canCreateAccount(msisdn, token)
  - if msisdn record found with matching, unexpired token
    - update msisdn record: remove token reference, add the current
timestamp to the recent registrations field, bump record's expiration.
    - clean up token record
    - *return true*
  - *return false*
After block 512, process 500 returns to a calling process to perform
other actions.
```

Figure 6:
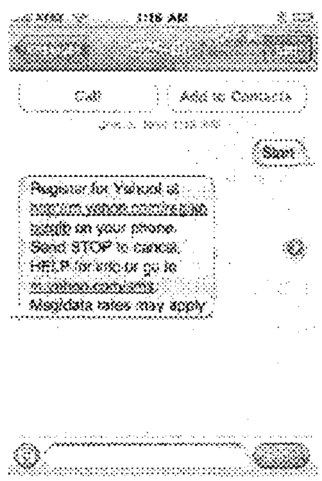
FIG. 6 illustrates a series of screen shots that can be displayed by a mobile device during SMS-initiated mobile registration.
Figure 6:
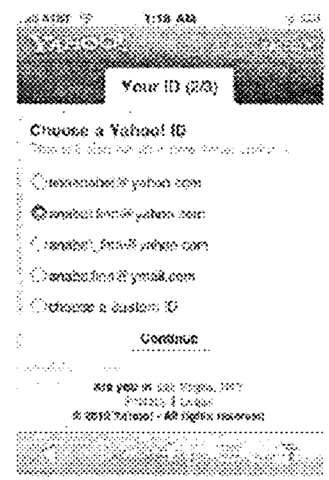
Figure 6:
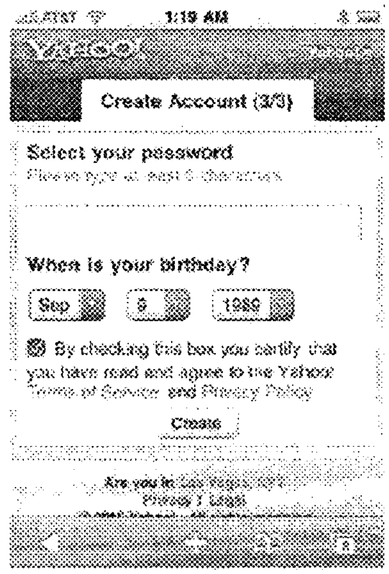
Figure 6:
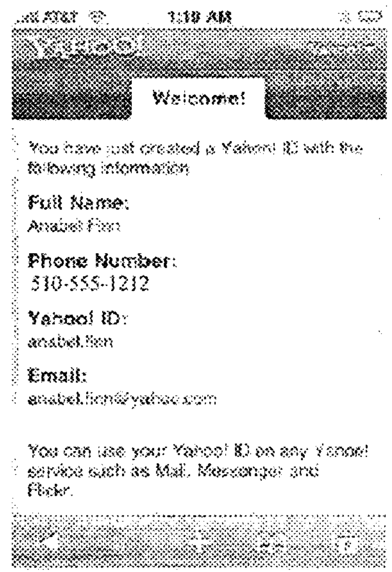

FIG. 6 illustrates one embodiment of a series of possible screen shots displayed by a mobile device during SMS-initiated mobile registration. Screen 601 depicts an SMS message log in which a user has sent a request SMS initiating the registration process. In this example, "START" has been texted to short code 92500. Screen 601 also depicts a reply SMS message containing a URL to a registration web page, where the URL includes the random generated token 'kobizgfb'.

Screen 602 depicts an example first registration web page displayed in response to the user activating the link in the reply SMS message. In this example screen, a user may enter their first and last name, and indicate their gender.

Screen 603 depicts an example of a subsequent registration page that is displayed upon activating the 'continue' button on the first registration page. However, it is also contemplated that all registration information is entered into a single registration page. In one embodiment, the second registration page displays a list of available user IDs, enabling the user to select a user ID without having to type and then verify the availability of a custom ID.

Screen 604 depicts a third registration page where a user may enter their password and/or their birthday. Screen 605 depicts a confirmation page containing the information associated with their new account ID.

Figure 7:
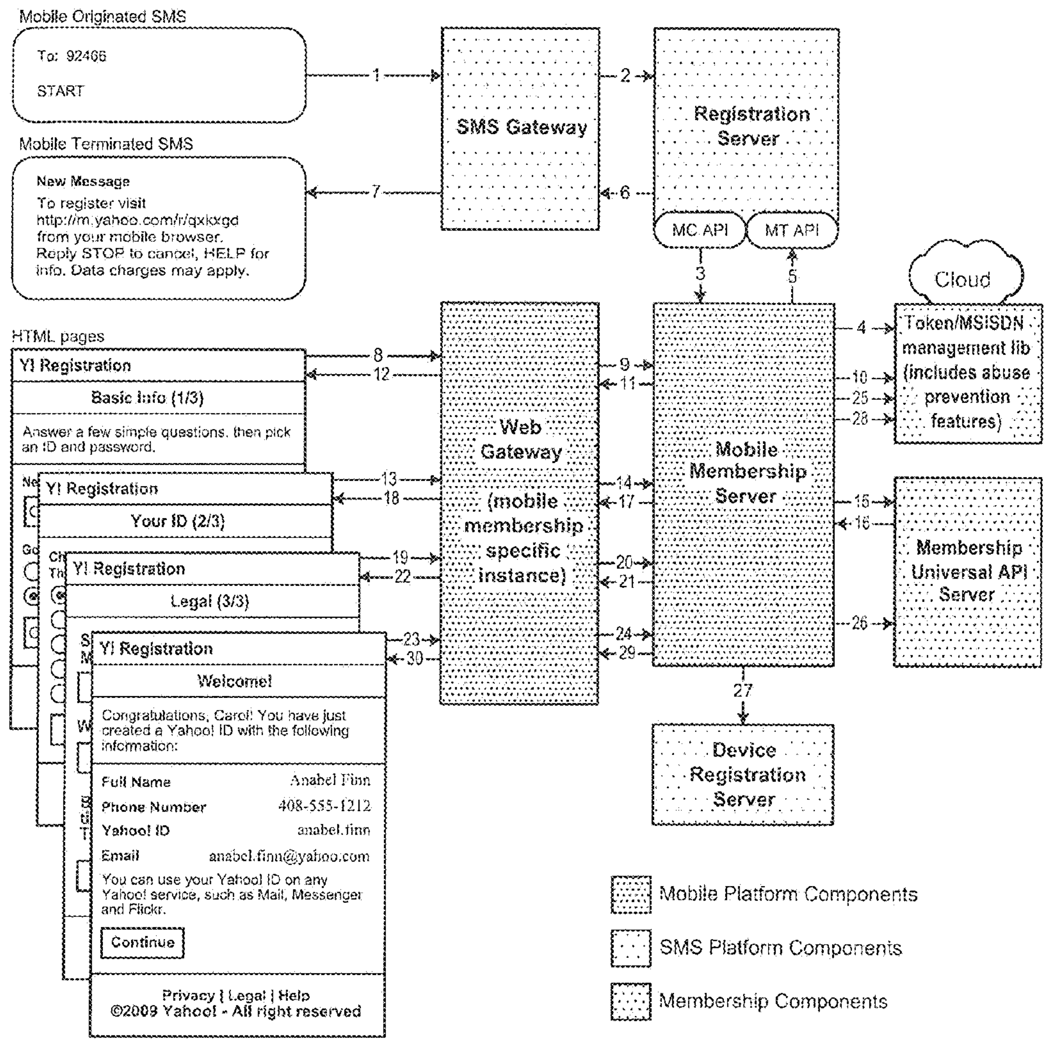
FIG. 7 illustrates a diagram showing the interaction of components used when performing. SMS-initiated mobile registration.

FIG. 7 illustrates a diagram showing one example of the interaction of the primary components of the registration flow when performing SMS-initiated mobile registration. The steps below correspond to the interactions in FIG. 7:

| | Protocol | Action taken |
|---|---|---|
| 1 | SMS | User sends SMS text with message "START" to shortcode to initiate registration process |
| 2 | | SMS gateway passes message to registration server |
| 3 | HTTP | Registration server looks up message/shortcode combination and uses MO API (over HTTP) to pass message, MSISDN, and carrier info to mobile membership server |
| 4 | Lib call | Mobile membership server determines intl/lang using Carrier Catalog, calls MSISDN/token management lib and composes message with URL and token |
| 5 | HTTP | Mobile membership server calls registration server MT API (over HTTP) to send reply SMS message containing URL to registration page |
| 6 | | Registration server dispatches reply SMS Message to SMS gateway |

-continued

| | Protocol | Action taken |
|---|---|---|
| 7 | SMS | Reply SMS sent to mobile device |
| 8 | HTTP GET Req | User opens URL from reply SMS in their mobile browser |
| 9 | HTTP GET Req | Web Gateway sends request to mobile membership server |
| 10 | Lib call | Mobile membership server calls MSISDN/token management lib to resolve token data |
| 11 | HTTP GET Resp | Mobile membership server returns Blueprint for first Registration page |
| 12 | HTTP GET Resp | Web Gateway renders Blueprint to HTML appropriate for particular device |
| 13 | HTTP POST Req | User submits first Registration page form |
| 14 | HTTP POST Req | Web Gateway sends request to mobile membership server |
| 15 | HTTP POST Req | Mobile membership server validates data, if no error calls UMAPI to get user ID suggestions |
| 16 | HTTP POST Resp | UMAPI returns user ID suggestions |
| 17 | HTTP POST Req | Mobile membership server returns Blueprint for second Registration page |
| 18 | HTTP POST Resp | Web Gateway renders Blueprint to HTML appropriate for particular device |
| 19 | HTTP POST Req | User submits second Registration page form |
| 20 | HTTP POST Req | Web gateway sends request to mobile membership server |
| 21 | HTTP POST Resp | Mobile membership server validates data and if no error returns Blueprint for final Registration page |
| 22 | HTTP POST Resp | Web gateway renders Blueprint to HTML appropriate for particular device |
| 23 | HTTP POST Req | User submits final Registration page form |
| 24 | HTTP POST Req | Web gateway sends request to mobile membership server |
| 25 | Lib call | Mobile membership server calls MSISDN/token management lib to set MSISDN into creating state |
| 26 | HTTP POST | Mobile membership server calls UMAPI to create account, user ID now created |
| 27 | HTTP GET | Mobile membership server calls Device Registration API to associate user ID with MSISDN and flag as validated |
| 28 | Lib call | Mobile membership server calls MSISDN/token management lib to set MSISDN to created state |
| 29 | HTTP POST Resp | Mobile membership server returns Blueprint for account created confirmation page |
| 30 | HTTP POST Resp | Web Gateway renders Blueprint to HTML appropriate for particular device |

FIG. 8 illustrates a diagram showing one embodiment of registration data during a process for registering a new MSISDN.

Row 801 illustrates a token generated in response to a request SMS message, as discussed above in conjunction with block 404 of FIG. 4 and block 504 of FIG. 5. In this example, the token is 'abcdefgh', and it is associated with MSISDN number 14085551212.

Row 802 illustrates one embodiment of the generated token and an MSISDN entry upon creation, when includes: the MSISDN number of the mobile device, the generated token, a span of time after which the token will expire, a count of the number of times a token as expired for this MSISDN, and a time stamp indicating when the most recent registration occurred.

Row 803 illustrates one embodiment of the generated token and an MSISDN entry upon successful completion of a registration. In one embodiment the MSISDN entry includes the MSISDN number of the registrant and a time stamp indicating when registration was completed. In one embodiment, the token used during registration, the time until the token expires, and the count of the number of token expirations are removed from the MSISDN entry upon registration.

Row 804 illustrates one embodiment of an MSISDN entry upon registration, while the generated token has been removed.

Row 851 illustrates one embodiment of a second generated token and an MSISDN from which registration has already been attempted. In this example, the second generated token is ijklmnop, the MSISDN number is 14085551212, and the most recent registration was 8 hours ago.

Row 852 illustrates one embodiment of the second generated token and the MSISDN entry that has been updated to include information from the second generated token.

Row 853 illustrates one embodiment of the second generated token and the MSISDN entry that has been updated with the count of token expiration extensions. In the illustrated example, the number of token expiration extensions is 1.

Row 854 illustrates one embodiment of the second generated token and the MSISDN entry after another attempt at registration has completed. In this example the token value, the token expiration time span, and the count of token expiration extensions have been removed.

Row 855 illustrates one embodiment of the MSISDN entry after two registration attempts.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A computer based method comprising:

receiving, by at least one computer processing unit, a request Short Message Service (SMS) message from a mobile device;

generating, by the at least one computer processing unit, a token and associating the token with a mobile device identifier of the mobile device in response to the request;

transmitting, by the at least one computer processing unit, a response SMS message to the mobile device, the response SMS message including a Uniform Resource Identifier (URI) to a registration web page comprising at least one field for receiving registration information for a user to be used in creating an online account for the user, wherein the URI includes the generated token;

receiving, by the at least one computer processing unit, the registration information submitted to the registration web page and the token included in the URI of the registration web page;

associating, by the at least one computer processing unit, the submitted registration information and the mobile device identifier based on the token; and creating, by the at least one computer processing unit, the online account based on the registration information and the associated mobile device identifier.

2. The computer based method of claim 1, further comprising:

expiring the generated token after a defined amount of time.

3. The computer based method of claim 1, wherein the request SMS message further includes a subset of the registration information.

4. The computer based method of claim 1, wherein the mobile device identifier is extracted from the request SMS message.

5. The computer based method of claim 1, wherein the registration web page includes a list of available user identifiers derived from a name of a user registering the online account.

6. The computer based method of claim 1, further comprising:

receiving a request for account recovery;

transmitting an SMS message including a confirmation code to the mobile device;

receiving the confirmation code at an account recovery web page; and authorizing the account recovery.

7. The computer based method of claim 1, wherein the mobile device is prevented from registering more than a threshold number of accounts.

8. The computer based method of claim 1, wherein the mobile device is prevented from registering accounts at greater than a threshold rate.

9. The computer based method of claim 1, further comprising:

deriving a geographical region associated with the mobile device based on a country code of the mobile device identifier and a header submitted with the registration web page.

10. A non-transitory computer readable storage medium storing instructions that when executed by a processor cause actions to be performed, the actions comprising:

receiving a request Short Message Service (SMS) message from a mobile device;

generating a token and associating the token with a mobile device identifier of the mobile device in response to the request;

transmitting a response SMS message to the mobile device, the response SMS message including a Uniform Resource Identifier (URI) to a registration web page comprising at least one field for receiving registration information for a user to be used in creating an online account for the user, wherein the URI includes the generated token;

receiving the registration information submitted to the registration web page and the token included in the URI of the registration web page;

associating the submitted registration information and the mobile device identifier based on the token; and creating the online account based on the registration information and the associated mobile device identifier.

11. The non-transitory computer readable storage medium of claim 10, wherein the request SMS message further includes a subset of the registration information.

12. The non-transitory computer readable storage medium of claim 10, wherein the mobile device identifier of the mobile device is extracted from the request SMS message.

13. The non-transitory computer readable storage medium of claim 10, further storing instructions that when executed by the processor perform actions comprising:

receiving a request for account recovery at an account recovery web page;

sending an SMS message including a confirmation code to the mobile device;

receiving the confirmation code at the account recovery web page; and authorizing the account recovery.

14. The non-transitory computer readable storage medium of claim 10, wherein the registration web page includes a list of available user identifiers derived from a name of a user registering the online account.

15. A mobile registration device comprising:

a processor;

a non-transitory storage medium for tangibly storing thereon program logic for execution by the processor, the stored program logic comprising:

receiving logic executed by the processor for receiving a request Short Message Service (SMS) message from a mobile device;

generating logic executed by the processor for generating a token and associating the token with a mobile device identifier of the mobile device in response to the request;

transmitting logic executed by the processor for transmitting a response SMS message to the mobile device, the response SMS message including a Uniform Resource Identifier (URI) to a registration web page comprising at least one field for receiving registration information for a user to be used in creating an online account for the user, wherein the URI includes the generated token;

receiving logic executed by the processor for receiving the registration information submitted to the registration web page and the token included in the URI of the registration web page;

associating logic executed by the processor for associating the submitted the registration information and the mobile device identifier based on the token; and creating logic executed by the processor for creating the online account based on the registration information and the associated mobile device identifier.

16. The mobile registration device of claim 15, the receiving logic for receiving registration information further comprising:

receiving logic executed by the processor for receiving the registration information from the mobile device via the registration web page that is made available to the mobile device via a web server device.

17. The mobile registration device of claim 15, wherein the request SMS message further includes a subset of the registration information.

18. The mobile registration device of claim 15, wherein the registration web page comprises a plurality of web pages submitted in series.

19. The mobile registration device of claim 15, wherein the mobile device is prevented from registering more than a threshold number of accounts.

20. The mobile registration device of claim 15, wherein the token expires after a defined period of time.

* * * * *